United States Patent
Casey et al.

(10) Patent No.: US 7,604,415 B2
(45) Date of Patent: *Oct. 20, 2009

(54) SHAFT MOUNTING ASSEMBLY

(75) Inventors: Marlon R. Casey, Indianapolis, IN (US); Aaron H. Kunkle, Indianapolis, IN (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/209,012

(22) Filed: Sep. 11, 2008

(65) Prior Publication Data

US 2009/0016661 A1 Jan. 15, 2009

Related U.S. Application Data

(63) Continuation of application No. 11/414,817, filed on May 1, 2006, now Pat. No. 7,503,698.

(51) Int. Cl.
*F16C 35/073* (2006.01)
(52) U.S. Cl. .................................... 384/538; 384/906
(58) Field of Classification Search ............. 384/538, 384/906, 44, 51; 403/369–371
See application file for complete search history.

(56) References Cited

U.S. PATENT DOCUMENTS

| | | | |
|---|---|---|---|
| 738,445 A | 9/1903 | Hoffmann | |
| 1,837,415 A | 12/1931 | Dull | |
| 1,957,062 A | 5/1934 | Graham et al. | |
| 2,045,896 A | 6/1936 | Brusca | |
| 2,213,400 A | 9/1940 | Laughridge | |
| 2,690,346 A | 9/1954 | Miller | |
| 2,970,018 A | 1/1961 | Ruttgers | |
| 3,636,508 A | 1/1972 | Ogilvy et al. | |
| 3,638,974 A | 2/1972 | Stratienko | |
| 3,718,066 A | 2/1973 | Daily | |
| 3,806,215 A | 4/1974 | Price et al. | |
| 3,807,820 A | 4/1974 | Schuhmann | |
| 3,953,142 A | 4/1976 | Price et al. | |
| 4,123,158 A | 10/1978 | Reytblatt | |
| 4,160,608 A | 7/1979 | Derner et al. | |

(Continued)

FOREIGN PATENT DOCUMENTS

DE 2939096 A1 4/1981

(Continued)

OTHER PUBLICATIONS

PCT/US2007/009778 ISR dated Apr. 20, 2007 [2 pp].

(Continued)

*Primary Examiner*—Thomas R Hannon
(74) *Attorney, Agent, or Firm*—Quarles & Brady LLP

(57) ABSTRACT

A wedge-type bearing assembly includes a split cylindrical adapter sleeve for wrapping around a shaft. The sleeve has a radially outwardly facing tapered surface. An inner ring encircles the adapter sleeve and has a radially inwardly facing surface engaging the tapered surface of the adapter sleeve. In one embodiment, a visual indicator fixed to a lock nut connecting the adapter sleeve and inner ring indicates when the adapter sleeve is sufficiently tightened onto the shaft. In another embodiment, a positive locking key prevents rotation of the inner ring relative to the adapter sleeve.

14 Claims, 6 Drawing Sheets

U.S. PATENT DOCUMENTS

| | | |
|---|---|---|
| 5,153,990 A | 10/1992 | Martinie |
| 5,203,221 A | 4/1993 | Logsdon |
| 5,269,607 A | 12/1993 | Lawson |
| 5,489,156 A | 2/1996 | Martinie |
| 5,709,483 A | 1/1998 | Martinie |
| 5,876,127 A | 3/1999 | Casey |
| 5,897,214 A | 4/1999 | Nislev |
| 6,129,456 A | 10/2000 | Okamoto |
| 6,425,690 B1 | 7/2002 | DeWachter |
| 6,893,160 B2 | 5/2005 | Casey |
| 6,948,381 B1 | 9/2005 | Discenzo |
| 6,985,214 B2 | 1/2006 | Szaroletta et al. |

FOREIGN PATENT DOCUMENTS

| | | |
|---|---|---|
| EP | 0324324 A1 | 7/1989 |
| EP | 0718515 | 6/1996 |

OTHER PUBLICATIONS

Vishay, PhotoStress Coatings, PhotoStress Coating Materials and Adhesives (Apr. 14, 2004).

Edmund Optics, Commercial Quality Linear Polarizing Laminated Film (Apr. 3, 2006).

An Innovative Polariscope for Photoelastic Stress Analysis, Jon R. Lesniak, Michael J. Zickel, Christopher S. Welch, Deonna F. Johnson.

SHAFT MOUNTING ASSEMBLY

CROSS REFERENCES TO RELATED APPLICATIONS

This application is a continuation application of U.S. patent application Ser. No. 11/414,817 entitled "Wedge-Type Bearing Assembly" filed on May 1, 2006 now U.S. Pat. No. 7,503,698, the disclosure of which is hereby incorporated by reference as if set forth in its entirety herein.

STATEMENT REGARDING FEDERALLY SPONSORED RESEARCH

Not Applicable.

BACKGROUND OF THE INVENTION

The field of invention is bearings, and more particularly, to a shaft mounted wedge-type bearing assembly.

It is generally known to mount bearing assemblies on a shaft through the use of set screws or eccentric collars which lock the inner ring of the bearing assembly to the shaft. In such designs, the inner ring of the bearing assembly extends longitudinally along the shaft and is incorporated in the mechanisms for sealing the inner ring against the shaft and for locking the bearing assembly on the shaft.

It is also known to provide a bearing assembly with an inner ring which has extending therethrough a tapered bore and which loosely surrounds the shaft. Such bearing assembly designs also include a cylindrical wedge or tapered mounting adapter sleeve that is also placed over the shaft. The sleeve has therein a longitudinally extending slit which allows the sleeve to be placed over the shaft but affords compression or squeezing the sleeve into frictional engagement with the shaft. The sleeve is typically pulled into engagement with the tapered bore in the inner ring of the bearing assembly by a lock nut axially fixed relative to the sleeve and threadably engaging the inner ring. Rotation of the nut around the sleeve draws the inner ring over the sleeve to produce a the wedge-like engagement between the tapered sleeve and the tapered bore. The wedge-like engagement creates an interference fit between the sleeve and the inner ring and compresses the sleeve into locked engagement with the shaft. The locked engagement between the inner ring and the sleeve, and between the sleeve and the shaft thereby fixes the inner ring relative to the shaft.

The use of a tapered sleeve in conjunction with a tapered inner ring to mount a bearing assembly on a shaft is advantageous in that this type of bearing assembly mounting accommodates shafts which may have a circumference differing from a nominal specified circumference. These wedge-type bearing assemblies, however, are difficult to mount on a shaft because the inner ring tends to rotate with the nut without moving the inner ring axially relative to the sleeve, the tightness of the nut is not easily determined which leads to over or under tightening, and axially fixing the nut relative to the sleeve is difficult. Therefore, a need exists for a shaft mounted wedge-type bearing assembly that overcomes one or more of these problems.

BRIEF SUMMARY OF THE INVENTION

The present invention provides a wedge-type bearing assembly that solves all of these problems. The bearing assembly includes a split cylindrical adapter sleeve for wrapping around a shaft. The sleeve has a radially outwardly facing tapered surface. An inner ring encircles the adapter sleeve and has a radially inwardly facing surface engaging the tapered surface of the adapter sleeve.

One objective of the present application is to provide a shaft mounted bearing assembly which prevents the inner ring from rotating independently from the sleeve frictionally engaging the shaft. In one embodiment, the bearing assembly accomplishes this objective by providing a positive locking key that rotatively fixes the inner ring relative to the sleeve to prevent the inner ring from rotating independently of the sleeve.

Another objective of the present invention is to provide a shaft mounted bearing assembly with which a user can easily determine when the adapter sleeve is sufficiently tightened on the shaft. In another embodiment, the bearing assembly accomplishes this objective by providing a visual indicator to indicate when the adapter sleeve is sufficiently tightened onto the shaft.

The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 3:
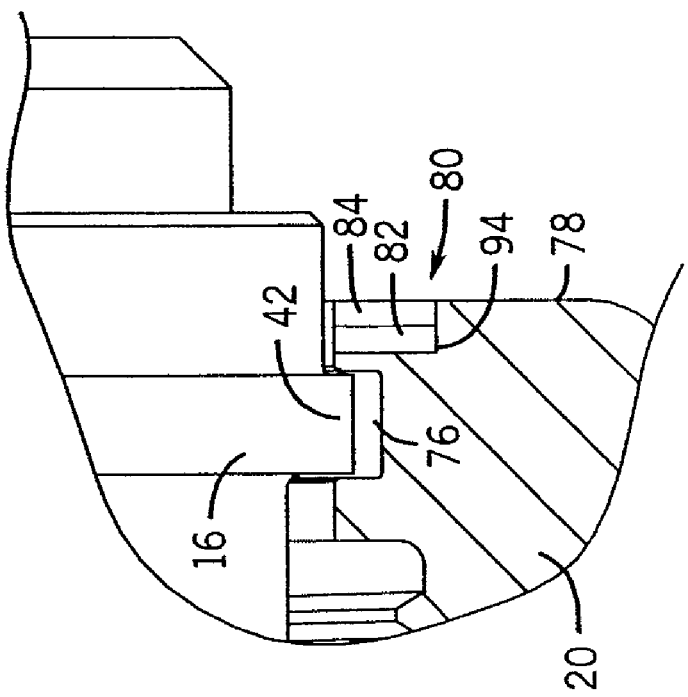
FIG. 3 is a detailed sectional view along line 3-3 of FIG. 2.
Figure 1:
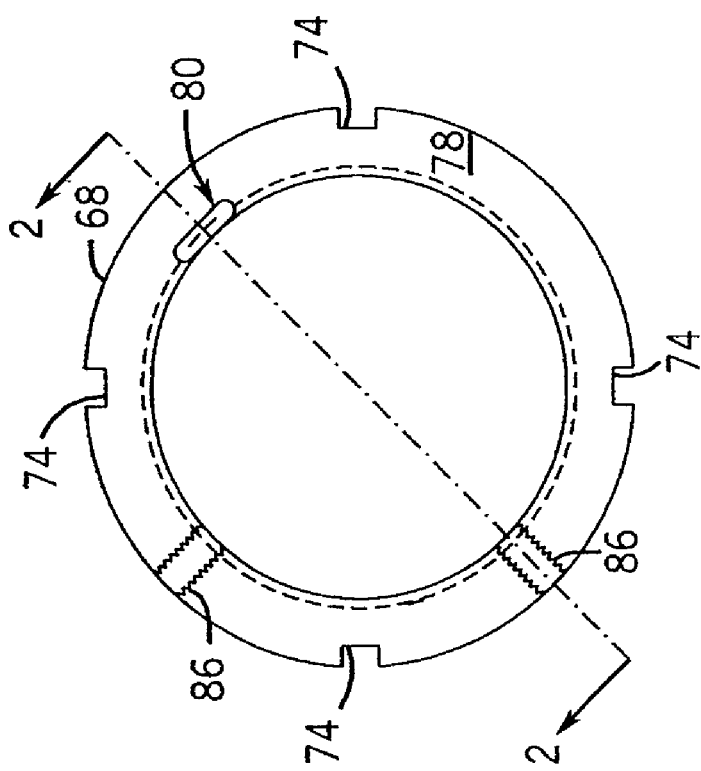
FIG. 1 is an end view of a shaft mounted bearing assembly incorporating the present invention.
Figure 2:
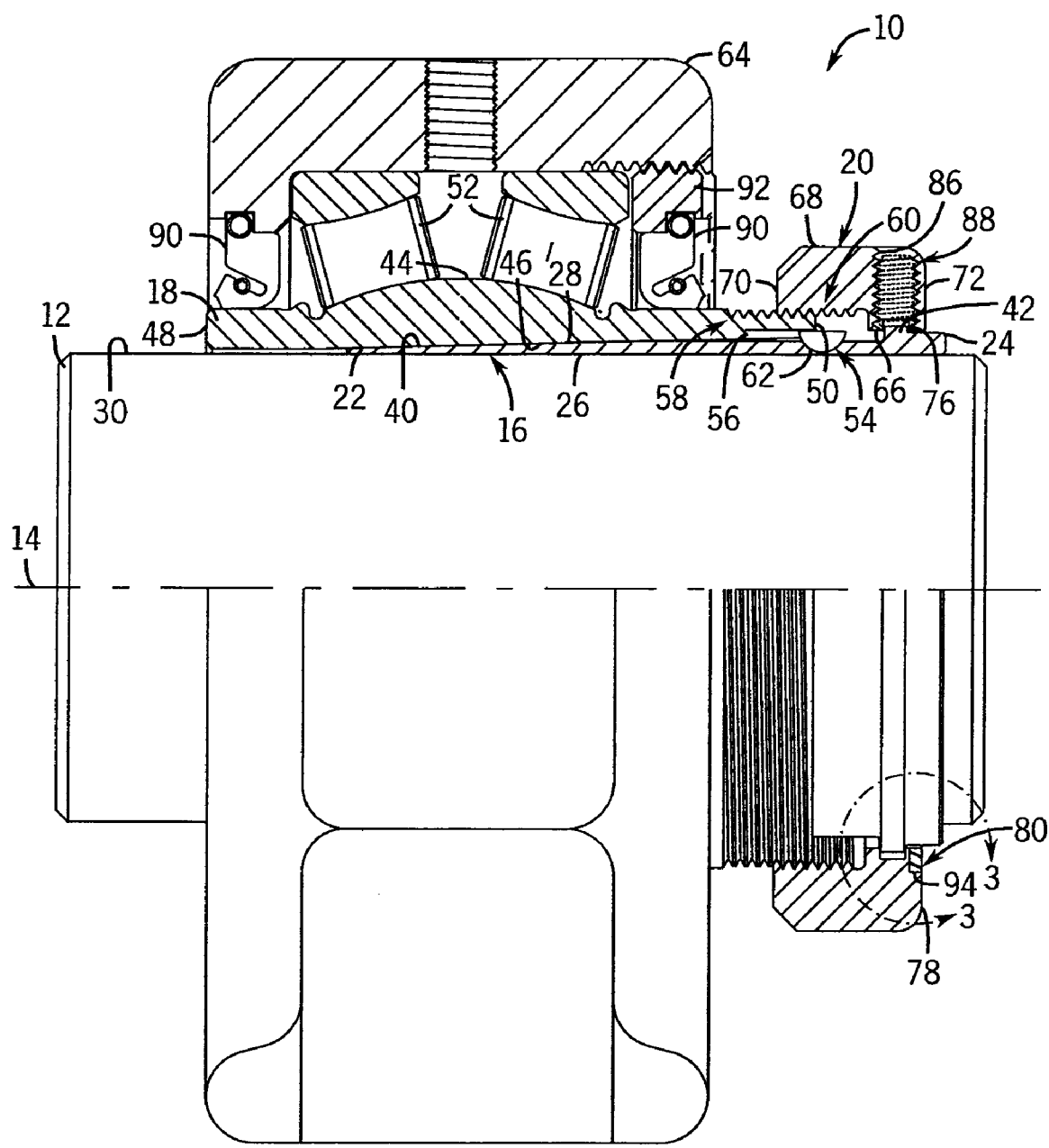
FIG. 2 is a cross sectional view along line 2-2 of FIG. 1.

As shown in FIGS. 1-3, a wedge-type bearing assembly 10 is mounted on a shaft 12 having a longitudinal axis 14. The bearing assembly 10 includes an adapter sleeve 16 frictionally engaging the shaft 12, an inner ring 18 compressing the adapter sleeve 16 against the shaft 12, and a lock nut assembly including a lock nut 20 axially fixed relative to the adapter sleeve 16 and engaging the inner ring 18. Rotation of the lock nut 20 in a first direction of rotation draws the inner ring 18 over the adapter sleeve 16 to mount the bearing assembly 10 to the shaft 12. Rotation of the lock nut 20 in a second opposite direction of rotation pushes the inner ring 18 off of the adapter sleeve 16 to dismount the bearing assembly 10 from the shaft 12.

The cylindrical adapter sleeve 16 extends along the axis 14 of the shaft 12 between adapter sleeve first and second ends 22, 24, and has a radially inwardly facing surface 26 and a radially outwardly facing surface 28. The radially inwardly facing surface 26 defines a uniform cylindrical bore which engages the outer surface 30 of the shaft 12. A longitudinal slit (not shown) having slit edges extends the entire axial length of the sleeve 16. The slit edges define a gap therebetween when the sleeve 16 is undeformed (i.e. not compressed by the inner ring 18) which is narrowed as the adapter sleeve 16 is radially compressed by the inner ring 18. The sleeve 16 is sized to slide over the shaft 12 when the sleeve 16 is undeformed, and the provision of the slit along the sleeve 16 affords compression of the sleeve 16 into locked frictional engagement with the shaft 12 in a manner discussed below.

The radially outwardly facing surface 28 of the sleeve 16 includes a tapered surface 40 engageable with the inner ring 18 and a radially outwardly extending circumferential key 42 engageable with the lock nut 20. The tapered surface 40 extends from the first end 22 of the sleeve 16 toward the second, opposite end 24 of the sleeve 16, and is frustoconical with a first relatively small diameter proximal the first end 22 of the sleeve 16. The diameter of the tapered surface 40 uniformly increases toward the sleeve second end 24. Various angles of taper, such as between about 3° to 4°, can be used.

The radially outwardly extending circumferential key 42 extends from the radially outwardly facing surface 28 proximal the second end 24 of the adapter sleeve 16. The key 42 rotatably slidably engages the lock nut 20 to axially fix the lock nut 20 relative to the adapter sleeve 16 while allowing the lock nut 20 to rotate relative to the adapter sleeve 16.

A positive locking key 54 extending radially from the radially outwardly extending facing surface 28 is received in an axially extending keyway 56 formed in the inner ring 18. Advantageously, the positive locking key 54 received in the axially extending keyway 56 prevents rotation of the inner ring 18 relative to the adapter sleeve 16 while allowing the inner ring 18 to slide axially relative to adapter sleeve 16. Preferably, the positive locking key 54 is a removable Woodruff key received in a concave rounded slot 62 formed in the adapter sleeve 16 to simplify assembly of the bearing assembly 10. However, the positive locking key 54 can have any shape and/or be formed as an integral part of the adapter sleeve 16 without departing from the scope of the invention. Moreover, the positive locking key 54 can extend from the inner ring 18 into a keyway formed in the adapter sleeve without departing from the scope of the invention.

The inner ring 18 of the bearing assembly 10 is configured to mate with the sleeve 16 so that the bearing assembly 10 can be fixed to the shaft 12. The generally annular inner ring 18 encircles the adapter sleeve 16 and shaft 12, and has an axis substantially coaxial with the shaft axis 14. The inner ring 18 includes a radially outwardly facing surface 44 and a radially inwardly facing surface 46 joined by axially opposing inner ring first and second ends 48, 50. The radially outwardly facing surface 44 provides a bearing surface for rollers 52.

The radially inwardly facing surface 26 of the inner ring 18 has a first diameter at the first axial end 48 of the inner ring 18 and a second diameter proximal the second axial end 50. The first diameter is smaller than the second diameter to form a tapered bore extending through the inner ring 18 between the axial ends 48, 50 of the inner ring 18. External threads 58 formed proximal the second axial end 50 in the radially outwardly facing surface 44 engage internal threads 60 formed in the lock nut 20 to draw the inner ring 18 over the adapter sleeve 16. Preferably, the radially inwardly facing surface 46 of the inner ring 18 lies at an angle relative to the axis 14 which approximates the angle of the tapered surface 40 of the sleeve 16. When the inner ring 18 is drawn over the adapter sleeve 16, the tapered surface 40 of the sleeve 16 slides along and engages the radially inwardly facing surface 46 of the inner ring 18 to compress the adapter sleeve 16 against the shaft 12.

The axially extending keyway 56 formed in the radially inwardly facing surface 46 receives the positive locking key 54 extending radially from the radially outwardly facing surface 28 of the sleeve 16. Advantageously, the positive locking key 54 received in the axially extending keyway 56 prevents the sleeve 16 from rotating while allowing the sleeve 16 to move axially relative to the inner ring 18. Of course, the keyway 56 can be formed in the adapter sleeve 16 for receiving a positive locking key 54 extending from the inner ring 18 without departing from the scope of the invention.

The cylindrical lock nut 20 of the lock nut assembly encircles the adapter sleeve 16 and engages both the adapter sleeve 16 and inner ring 18 to move the inner ring 18 relative to the adapter sleeve 16 in an axial direction. The lock nut 20 includes a radially inwardly facing surface 66 and a radially outwardly facing surface 68, both of which extend between first and second lock nut ends 70, 72. The internal threads 60 formed in the radially inwardly facing surface 66 proximal the lock nut first end 70 threadably engage the external threads 58 formed in the radially outwardly facing surface 44 of the inner ring 18.

The radially outwardly facing surface 68 of the lock nut 20 includes detents 74. The detents 74 are spaced circumferentially on the radially outwardly facing surface 68 of the lock nut 20 proximal the lock nut second end 72, and are engageable with a wrench to rotate the lock nut 20 relative to the inner ring 18 and adapter sleeve 16. Rotating the lock nut 20 relative to the inner ring 18 threadably engages the external threads 58 formed in the inner ring 18 with the internal threads 60 formed in the lock nut 20 to axially move the inner ring 18 relative to the adapter sleeve 16 in either axial direction.

A radially inwardly opening circumferential keyway 76 proximal the second end 72 of the lock nut 20 adjacent the internal threads 60 engages the circumferential key 42 of the adapter sleeve 16 to axially fix the lock nut 20 relative to the adapter sleeve 16. Advantageously, the keyway 76 fixes the lock nut 20 axially relative to the adapter sleeve 16 while allowing the lock nut 20 to rotate and threadably engage external threads 58 of the inner ring 18 with the internal threads 60 of the lock nut 20. Although an inwardly opening keyway 76 is disclosed, other structure that fixes the lock nut axially relative to the adapter sleeve 16 while allowing the lock nut 20 to rotate about the adapter sleeve 16 can be provided, such as a radially inwardly extending key of the lock nut 20 that engages a radially outwardly opening keyway formed in the adapter sleeve 16, and the like, without departing from the scope of the invention.

An axially opening cavity 94 formed in an axially facing face 78 of the second end 72 of the lock nut 20 proximal the radially inwardly facing surface 66 receives a visual indicator 80 that indicates when the lock nut 20 has been sufficiently tightened to frictionally lock the bearing assembly 10 to the shaft 12. Although forming the cavity 94 in the axially facing face 78 is preferred, the cavity 94 can be formed anywhere on the lock nut 20 that experiences the strain on the lock nut 20 caused by tightening the lock nut 20 to frictionally lock the bearing assembly 10 to the shaft 12 without departing from the scope of the invention.

Preferably, the visual indicator 80 is formed from a photoelastic sensitive material 82, such as Vishay Micro Measurements Model No. PS-1 Sheet available from Vishay Micro Measurements, Raleigh, N.C., which when subjected to strain changes color when viewed through a polarizing lens 84. The visual indicator 80 is fixed to the lock nut 20 in the cavity 94 by an adhesive, such as an epoxy resin, rubber-based adhesive, and the like, which has elastic properties substantially equivalent to the photoelastic sensitive material 82 in order to transfer the strain on the lock nut 20 to the photoelastic sensitive material 82 without losing sensitivity. Although fixing the visual indicator 80 in the cavity 94 formed in the lock nut 20 is preferred to protect the visual indicator 80 from being dislodged from the lock nut 20, the visual indicator 80 can be fixed to any surface on the lock nut 20 without departing from the scope of the invention.

The strain acting on the photoelastic sensitive material 82 changes the wavelength of light allowed to pass through the photoelastic sensitive material 82 and reflect back to the user causing the photoelastic sensitive material 82 to appear to change in color when viewed through the polarizing lens 84. The specific color viewable through the polarizing lens 84 is a function of the amount of strain experienced by the photoelastic sensitive material 82. The strain experienced by the photoelastic sensitive material 82 is a function of the load applied between the adapter sleeve 16 and the inner ring 18 by the lock nut 20. The load applied between the adapter sleeve 16 and the inner ring 18 frictionally locking the bearing assembly 10 to the shaft is a function of the torque necessary to turn the lock nut 20. As a result, the amount of torque applied to the lock nut 20 can be determined by viewing the color of the photoelastic sensitive material 82 through the polarizing lens 84.

Preferably, the polarizing lens 84 is a light polarizing film, such as available from Edmund Optics, Inc., Barrington, N.J., bonded to an outer surface of the photoelastic sensitive material 82. Of course, the polarizing lens 84 can be omitted and the user can provide a polarizing lens for viewing the photoelastic sensitive material 82 without departing from the scope of the invention.

A pair of radially extending threaded through holes 86 formed through the lock nut 20 threadably engage set screws 88 to rotatively fix the lock nut 20 relative to the adapter sleeve 16 once the lock nut 20 is sufficiently tightened to lock the adapter sleeve 16 onto the shaft 12. The threaded through holes 86 extend radially from the radially inwardly opening circumferential keyway 76 and align the set screws 88 with the circumferential key 42 extending from the adapter sleeve 16. Although a pair of threaded through holes circumferentially spaced at an angle of approximately 90° is shown, one or more through holes spaced randomly or evenly about the circumference of the lock nut 20 can be provided for receiving one or more set screws 88 without departing from the scope of the invention. Moreover, although the through holes 86 are shown to extend substantially perpendicular to the keyway 76 and key 42, the through holes 86 can define any angle relative to the keyway 76 and/or key 42 without departing from the scope of the invention.

Each set screw 88 threadably engages one of the threaded through holes 86, and is rotated to impinge on the circumferential key 42 to lock the lock nut 20 relative to the adapter sleeve 16. In the embodiment shown in FIGS. 1-3, each through hole 86 receives one of the set screws 88. However, more through holes 86 can be provided than the number set screws 88 without departing from the scope of the invention.

The bearing assembly 10 further includes an outer ring 64 radially spaced from the inner ring 18 to sandwich the plurality of rollers 52 therebetween. The rollers 52 allow the rings 18, 64 to move relative to each other. The term "roller" used herein can be any roller used in the art, such as ball bearings, cylindrical rollers, tapered rollers, and the like, that allow relative movement of the inner and outer rings 18, 64. A retainer ring (not shown) can be provided to space the rollers 52 between the inner and outer rings 18, 64.

Seal rings 90 extending between the inner and outer rings 18, 64 on opposing sides of the rollers 52 seal lubricant around the rollers 52. A seal mounting ring 92 fixed to one of the seal rings 90 threadably engaging the outer ring 64 can be provided to mount the seal ring 90 to the bearing assembly 10. A housing (not shown) can also be provided that surrounds the inner ring 18 and rollers 52 and is fixed relative to the outer ring 64 without departing from the scope of the invention.

In use, the bearing assembly 10 is mounted on the shaft 12 by compressing the adapter sleeve 16 to engage the lock nut keyway 76 with the circumferential key 42 of the adapter sleeve 16. The adapter sleeve 16 and lock nut 20 are then slipped axially onto the shaft 12. The inner ring 18, along with the rollers 52 and outer ring 64 are then slipped axially onto the shaft 12, such that the radially inwardly facing surface 26 of the inner ring 18 forming the tapered bore mates with the tapered surface 40 of the radially outwardly facing surface 28 of the adapter sleeve 16. The inner ring 18 is slipped axially along the adapter sleeve 16 until the external threads 58 of the inner ring 18 threadably engage the internal threads 60 of the lock nut 20.

The positive locking key 54 of the adapter sleeve 16 is then slipped into the axial keyway 56 of the inner ring 18, and the inner ring 18 is urged axially over the adapter sleeve 16, such as by the user pushing the inner ring 18 over the adapter sleeve 16 by hand, to initially compress the adapter sleeve 16 and frictionally engage the shaft 12 to prevent the inner ring 18 from rotating relative to the adapter sleeve 16. The lock nut 20 is then rotated in the first direction to threadably engage the internal threads 60 of the lock nut 20 with the external threads 58 of the inner ring 18 to draw the inner ring 18 over the adapter sleeve 16 toward the lock nut 20. As the tapered surface 40 of the adapter sleeve 16 and the tapered bore of the inner ring 18 become wedged together, the sleeve 16 compresses and the gap 38 defined by the slit edges 34, 36 narrows as the sleeve 16 frictionally engages the shaft 12. The lock nut 20 is rotated until a sufficient amount of torque is applied to the lock nut 20 to lock the adapter sleeve 16, and thus the bearing assembly 10, onto the shaft 12. Advantageously, the visual indicator 80 mounted on the lock nut 20 turns color to indicate to the user when the sufficient amount of torque has been applied to the lock nut 20 to avoid over tightening or under tightening the lock nut 20.

Once the lock nut 20 is sufficiently tightened, as indicated by the visual indicator 80, the lock nut 20 is locked in place relative to the adapter sleeve 16 by rotating the pair of set screws 88 threadably engaging the radially the extending threaded through holes 86 formed through the lock nut 20. The set screws 88 are tightened against the circumferential key 42 of the adapter sleeve 16 to fix the lock nut 20 relative to the adapter sleeve 16 and prevent rotation of the lock nut 20 relative to the adapter sleeve 16 that would allow the inner ring 18 to move axially relative to the adapter sleeve 16 and disengage the adapter sleeve 16, and thus the bearing assembly 10, from the shaft 12.

The bearing assembly 10 is dismounted from the shaft 12 by rotating the lock nut 20 in the second direction opposite to the first direction of rotation. Rotating the lock nut 20 in the second direction urges the inner ring 18 axially off of the adapter sleeve 16 to unwedge the tapered surface 40 of the adapter sleeve 16 and the tapered bore of the inner ring 18. As the inner ring 18 is urged axially off of the adapter sleeve 16, the adapter sleeve 16 expands to release its grip on the shaft 12.

In an alternative construction shown in FIGS. 4-7, the bearing assembly 110 includes an axially slit adapter sleeve 116 compressed onto a shaft 112 by an inner ring 118 urged over the adapter sleeve 116 by a lock nut assembly including an unthreaded lock nut 120. The inner ring 118 has a radially inwardly facing surface 146 including a tapered bore, such as described above. The tapered bore of the inner ring 118 slidably engages the adapter sleeve 116 to compress the adapter sleeve 116 against the shaft 112. In this embodiment, an outwardly facing surface 128 of the adapter sleeve 116 includes a radially outwardly opening circumferential keyway 176 which receives a radially inwardly extending key 142 forming part of the lock nut assembly.

Figure 4:
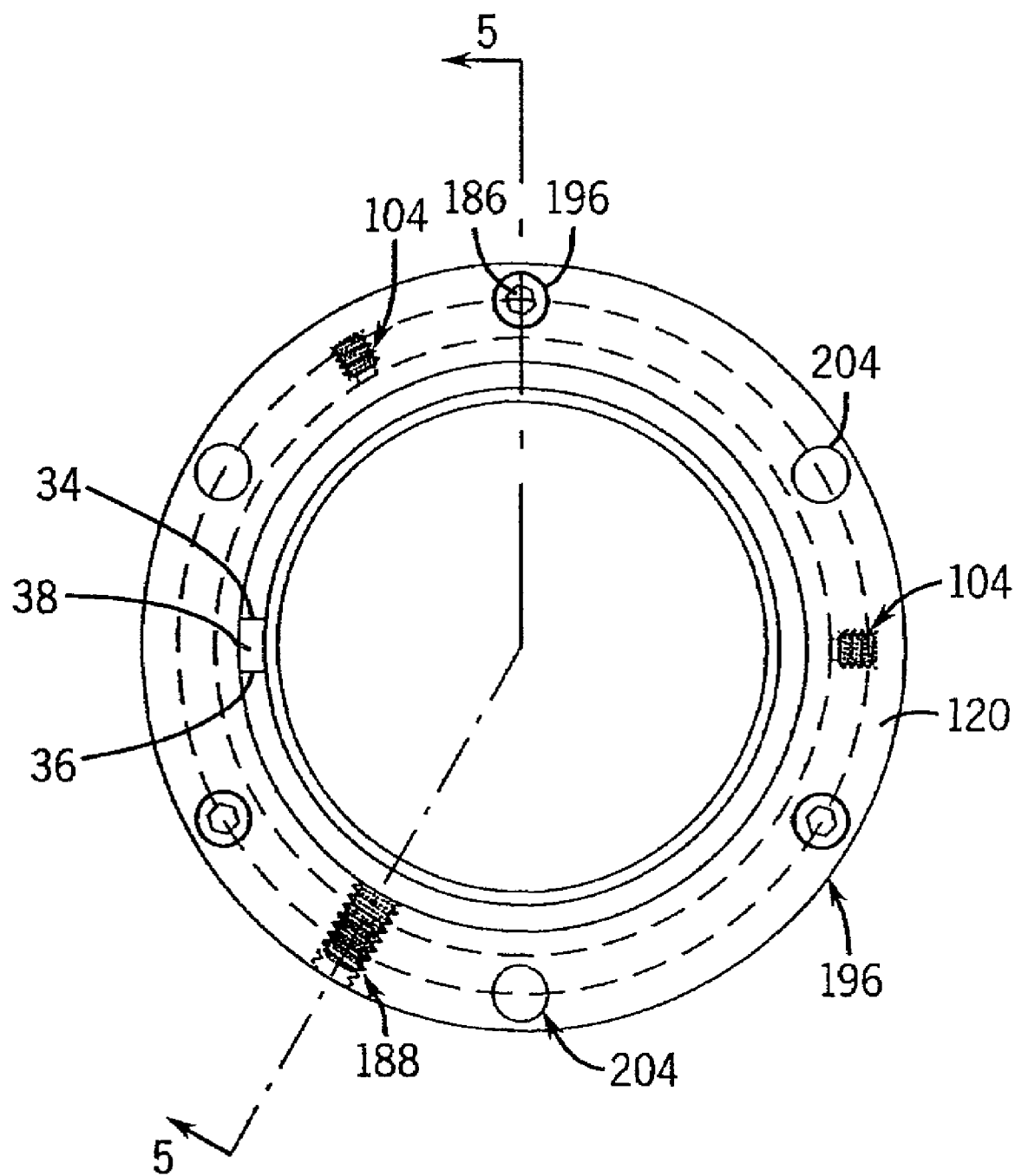
FIG. 4 is an end view of an alternative shaft mounted bearing assembly incorporating the present invention.
Figure 5:
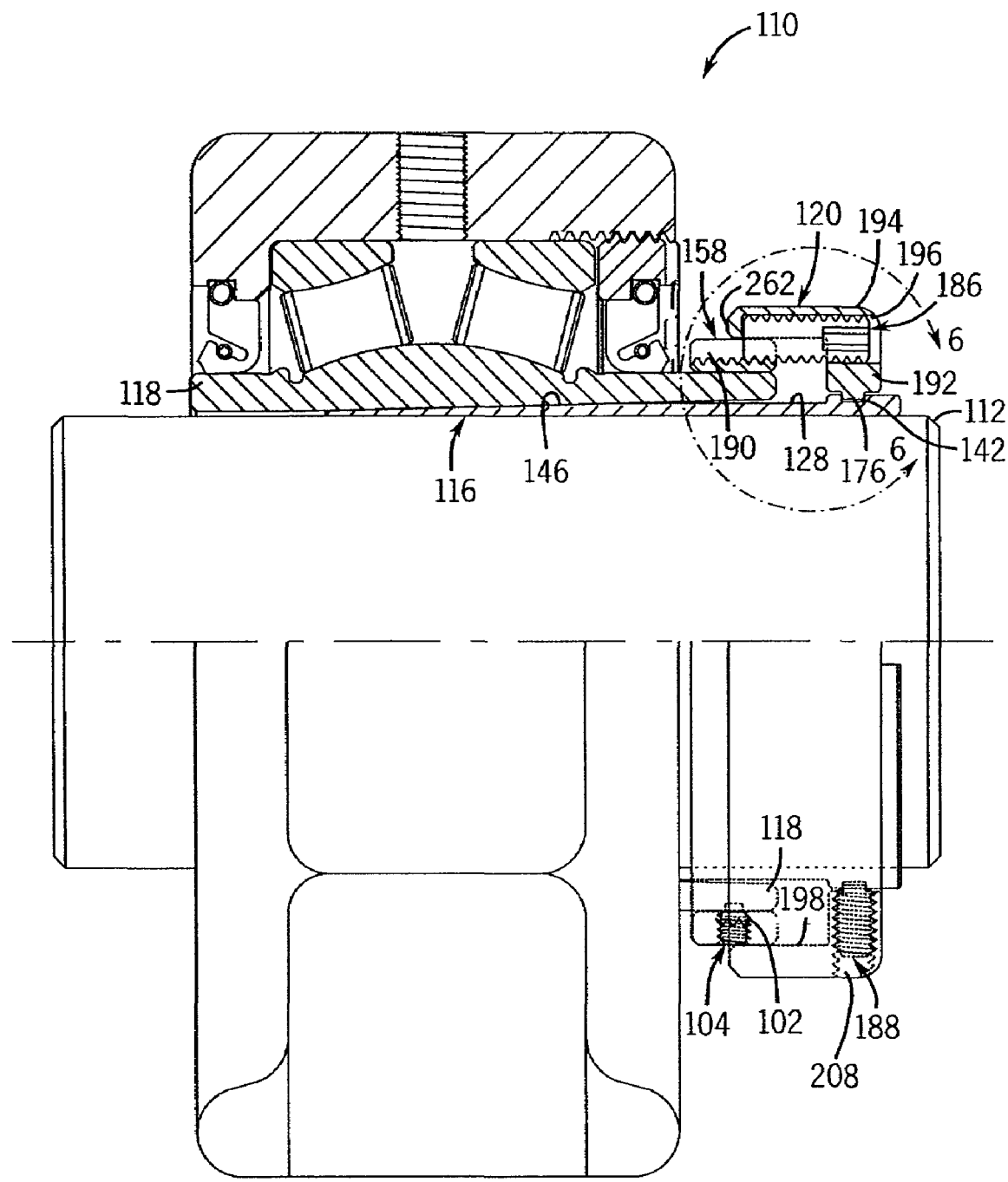
FIG. 5 is a cross sectional view along line 5-5 of FIG. 4.
Figure 6:
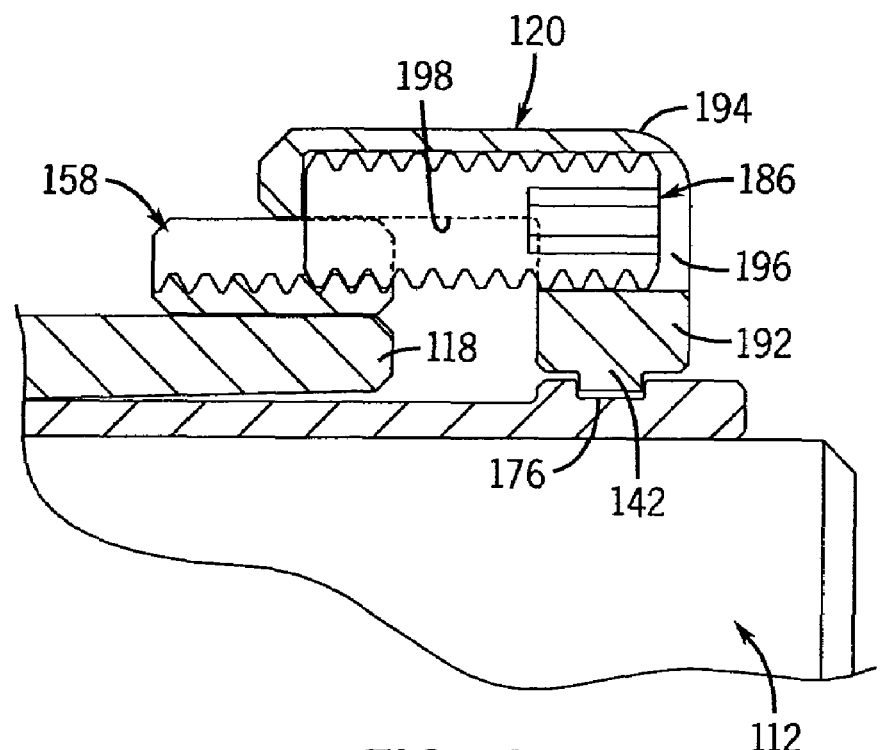
FIG. 6 is a detailed view along line 6-6 of FIG. 5.

In the embodiment disclosed in FIGS. 4-6, the lock nut assembly includes the lock nut 120 surrounding the adapter sleeve 116, a lock nut adapter 158 fixed to the inner ring 118, a locking set screw 188, and a plurality of mounting set screws 186. The lock nut 120 is axially fixed relative to the adapter sleeve 116 by the locking set screw 188, and the mounting set screws 186 extending axially through the lock nut 120 threadably engage the lock nut adapter 158 to draw the inner ring 118 onto the adapter sleeve 116.

The lock nut adapter 158 surrounds the inner ring 118 and includes a radially extending threaded aperture 102 formed therethrough. The threaded aperture 102 threadably engages a radially extending locking set screw 104 which impinges on the inner ring 118 to axially fix the lock nut adapter 158 relative to the inner ring 118. Advantageously, the locking set screw 104 allows removal of the lock nut adapter 158 or easy retrofitting of the lock nut adapter 158 onto an inner ring. Other methods for axially fixing the lock nut adapter 158 relative to the inner ring 118 can be used, such as by inserting an axially extending pin through a radially extending aperture formed through the lock nut adapter 158 into a hole formed in the inner ring 18, welding the lock nut adapter 158 to the inner ring 18, and the like, without departing from the scope of the invention.

Three axially extending semi-circular threaded holes 190 are formed in the lock nut adapter 158 for threadably engaging the mounting set screws 186. The semi-circular threaded holes 190 are evenly spaced about the outer diameter of the lock nut adapter 158 and threadably engage the mounting set screws 186 to draw the inner ring 18 over the adapter sleeve 116. Although three evenly spaced semi-circular threaded holes 190 are preferred, any number of semi-circular threaded holes 190 can be used without departing from the scope of the invention.

The lock nut 120 is axially fixed relative to the adapter sleeve 116, and includes a radially inward portion 192 and a radially outward portion 194. The radially inward portion 192 has an axial length less than the radially outward portion 194 which extends over a portion of the lock nut adapter 158 fixed to the inner ring 18. The radially inwardly extending key 142 extends radially inwardly into the radially outwardly opening circumferential keyway 176 from the radially inward portion 192 of the lock nut 120 to axially fix the lock nut 120 relative to the adapter sleeve 116. Advantageously, the inwardly extending key 142 received in the outwardly opening keyway 176 axially fixes the lock nut 120 relative to the adapter sleeve 116 while allowing the lock nut 120 to revolve around the adapter sleeve 116 to align mounting holes 196 formed in the lock nut 120 with the semi-circular threaded holes 190 formed in the lock nut adapter 158.

The three circumferentially spaced, axially extending mounting holes 196 are formed through the radially inward portion 192 of the lock nut 120 and in a radially inwardly facing surface 198 of the radially outward portion 194 of the lock nut 120. The mounting holes 196 stop short of extending through the radially outward portion 194 of the lock nut 120 which forms a stop 262 that prevents the mounting set screws 186 from passing through the lock nut 120 as the mounting set screws 186 threadably engage the semi-circular threaded holes 190 of the lock nut adapter 158. As shown in FIG. 6, each mounting hole 196 receives one of the mounting set screws 186 which engage one of the axially extending semi-circular threaded holes 190 forming in the lock nut adapter 158. Rotation of the threadably engaged mounting set screws 186 in the mounting hole 196 draws the inner ring 118 over the adapter sleeve 116 to frictionally fix the adapter sleeve 116, and thus the bearing assembly 110, onto the shaft 112.

Figure 7:
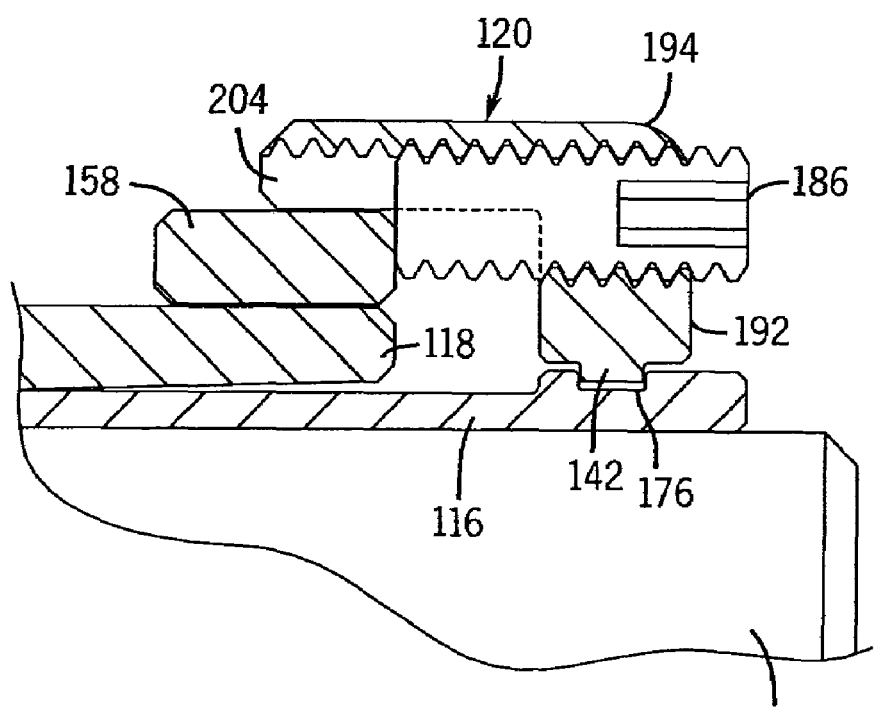
FIG. 7 is a detailed view of FIG. 5 showing a dismounting hole.

Three circumferentially spaced, axially extending threaded dismounting holes 204 are formed through the radially inward portion 192 of the lock nut 120 and in the radially inwardly facing surface 198 of the radially outward portion 194 of the lock nut 120. Each dismounting hole 204 receives one of the mounting set screws 186 which threadably engages the internal threads formed in the threaded dismounting hole 204. As shown in FIG. 7, the threaded dismounting holes 204 are formed through the lock nut 120 circumferentially spaced from the mounting holes 196, such that the set screws 186 abut an end 206 of the lock nut adapter 158. Rotation of the threadably engaged mounting set screws 186 in the dismounting holes 204 urges the inner ring 118 off of the adapter sleeve 116 to disengage the adapter sleeve 116, and thus the bearing assembly 110, from the shaft 112.

A radially extending threaded through hole 208 formed through the lock nut 120 receives the lock nut locking set screw 188 that impinges on the adapter sleeve 116 to fix the lock nut 120 relative to the adapter sleeve 116. Advantageously, the locking set screw 188 locks the lock nut 120 relative to the adapter sleeve 116 once the axially extending mounting holes 196 are aligned with semi-circular threaded holes 190 formed in the lock nut adapter 158.

In the embodiment disclosed in FIGS. 4-7, the bearing assembly 110 is mounted on the shaft 112 by compressing the adapter sleeve 116 to slip the lock nut adapter 158 and lock nut 120 over the adapter sleeve 116 and engage the adapter sleeve keyway 176 with the circumferential key 142 of the lock nut 120. The adapter sleeve 116 and lock nut 120 are then slipped axially onto the shaft 112. The inner ring 18, along with rollers 152 and an outer ring 164 are then slipped axially onto the shaft 112, such that the radially inwardly facing surface 126 of the inner ring 118 forming the tapered bore mates with the tapered surface 140 of the radially outwardly facing surface 128 of the adapter sleeve 116. The inner ring 118 is slipped axially along the adapter sleeve 16 until the lock nut adapter 158 encircles the inner ring 118. The locking set screw 104 threadably engaging the lock nut adapter threaded aperture 102 is rotated to impinge against the inner ring 118 and axially fix the lock nut adapter 158 relative to the inner ring 118.

The lock nut 120 is then rotated to align each of the mounting holes 196 with one of the semi-circular threaded holes 190 formed in the lock nut adapter 158. Once the mounting holes 196 and semi-circular threaded holes 190 are aligned, the radially extending lock nut locking set screw 188 is rotated to fix the lock nut 120 relative to the adapter sleeve 116. Each mounting set screw 186 is then inserted into one of the mounting holes 196 and threadably engaged with the aligned semi-circular threaded holes 190. Rotation of mounting set screws 186 draws the inner ring 118 over the adapter sleeve 116 to lock the adapter sleeve 116, and thus the bearing assembly 110, onto the shaft 112. Advantageously, a visual indicator, such as described above, can be mounted onto the lock nut 120 to determine when the mounting set screws 186 are sufficiently tight to lock the adapter sleeve 116, and thus the bearing assembly 110, onto the shaft 112.

The bearing assembly 110 is dismounted from the shaft 112 by disengaging the mounting set screws 186 from the threaded semi-circular threaded holes 190 and removing the mounting set screws 186 from the mounting holes 196. Each mounting set screw 186 is then threadably engaged in one of the threaded dismounting holes 204 until each mounting set screw 186 engages the end of the lock nut adapter 158. The mounting set screws 186 are then rotated to urge the inner ring 118 off of the adapter sleeve 116. As the inner ring 118 is urged axially off of the adapter sleeve 116, the adapter sleeve 116 expands to release its grip on the shaft 112, to disengage the bearing assembly 110 from the shaft 112.

Figure 8:
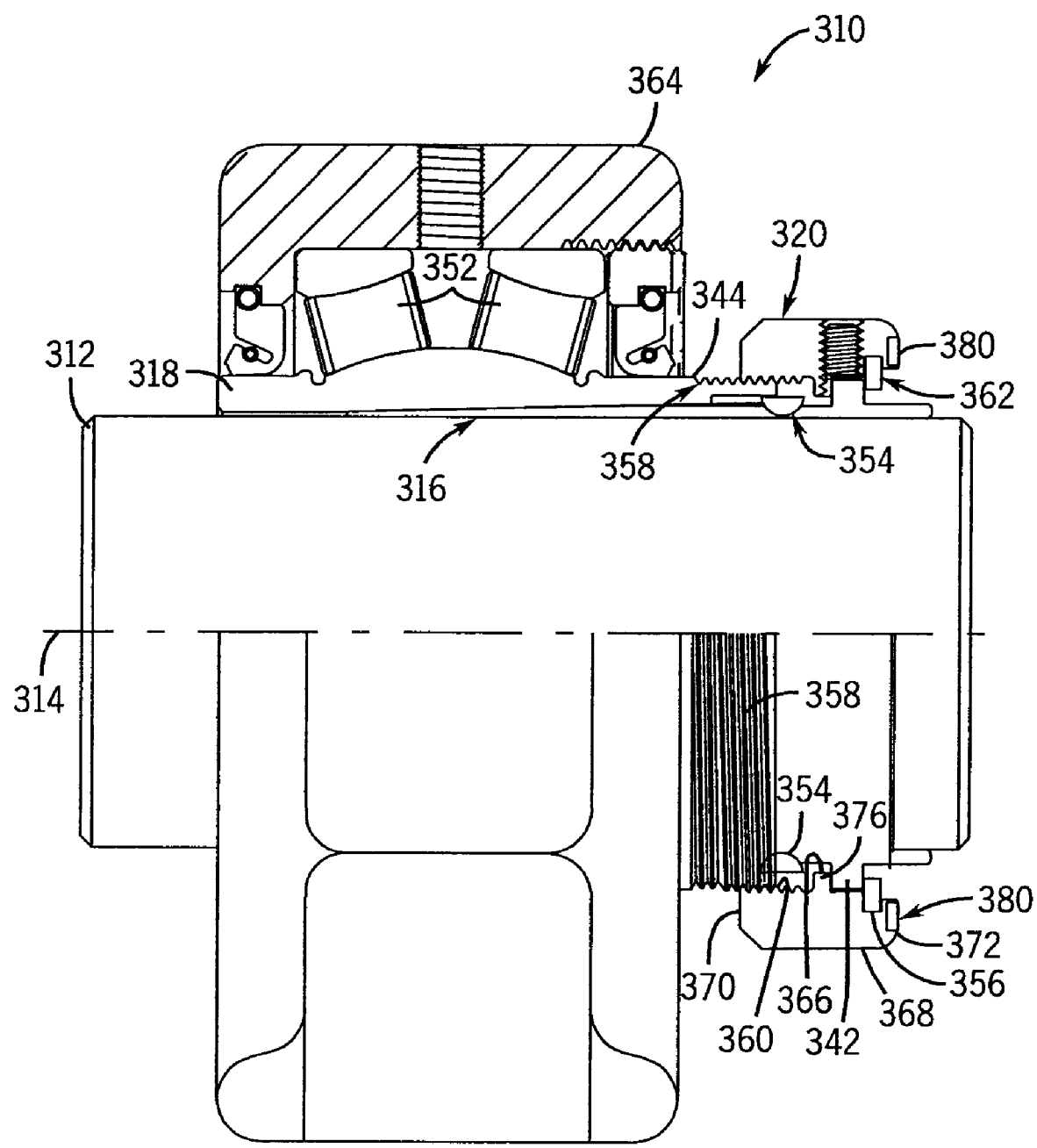
FIG. 8 is a cross sectional view of another alternative shaft mounted bearing assembly incorporating the present invention.

In another embodiment shown in FIG. 8, a wedge-type bearing assembly 310 is mounted on a shaft 312 having a longitudinal axis 314. The bearing assembly 310 includes an adapter sleeve 316 frictionally engaging the shaft 312, an inner ring 318 compressing the adapter sleeve 316 against the shaft 312, and a lock nut assembly including a lock nut 320 axially fixed relative to the adapter sleeve 316 and threadably engaging the inner ring 318. Rotation of the lock nut 320 in a first direction of rotation draws the inner ring 318 over the adapter sleeve 316 to mount the bearing assembly 310 to the shaft 312. Rotation of the lock nut 320 in a second opposite direction of rotation pushes the inner ring 318 off of the adapter sleeve 316 to dismount the bearing assembly 310 from the shaft 312.

The adapter sleeve 316 and inner ring 318 are substantially similar to the adapter 16 and inner ring 18 disclosed in FIGS. 1-3. In addition, as in the embodiment disclosed in FIGS. 1-3, the bearing assembly 310 includes rollers 352 interposed between the inner ring 318 and an outer ring 364, and a pair of positive locking keys 354 are interposed between the inner ring 318 and adapter sleeve 316 to prevent the inner ring 318 from rotating relative to the adapter sleeve 316 as the inner ring 318 is urged axially over the adapter sleeve 316 by the lock nut 320. In addition, a pair of visual indicators 380 are mounted on the lock nut 320 to indicate to the user when the sufficient amount of torque has been applied to the lock nut 320 to avoid over tightening or under tightening the lock nut 320.

The cylindrical lock nut 320 of the lock nut assembly engages both the adapter sleeve 316 and inner ring 318 to move the inner ring 318 relative to the adapter sleeve 316 in either axial direction. The lock nut 320 includes a radially inwardly facing surface 366 and a radially outwardly facing surface 368, both of which extend between first and second lock nut ends 370, 372. Internal threads 360 formed in the radially inwardly facing surface 366 proximal the lock nut first end 370 threadably engage external threads 358 formed in a radially outwardly facing surface 344 of the inner ring 318. Rotating the lock nut 320 relative to the inner ring 318 threadably engages the external threads 358 formed in the inner ring 318 with the internal threads 360 formed in the lock nut 320 to axially move the inner ring 318 relative to the adapter sleeve 316 in either axial direction.

A circumferential key 376 extending radially inwardly from the radially inwardly facing surface 366 proximal the second end 372 of the lock nut 320 adjacent the internal threads 360 engages a circumferential key 342 of the adapter sleeve 316 to axially fix the lock nut 320 relative to the adapter sleeve 16 in one axial direction. A circumferential radially inwardly opening slot 356 formed in the radially inwardly facing surface 366 receives a snap ring 362 that engages the circumferential key 342 of the adapter sleeve 316 to axially fix the lock nut 320 relative to the adapter sleeve 316 in an opposing axial direction. Locking the circumferential key 342 of the adapter sleeve 316 between the circumferential key 376 of the lock nut 320 and the snap ring 362 to axially fix the lock nut 320 relative to the adapter sleeve 316 simplifies assembly of the bearing assembly 310 on the shaft 312. Advantageously, the snap ring 362 and circumferential key 376 allow the lock nut 320 to rotate and threadably engage the external threads 358 of the inner ring 318 with the internal threads 360 of the lock nut 320.

In use, the bearing assembly 310 is mounted on the shaft 312 by slipping the lock nut 320 onto the adapter sleeve 316 to engage the lock nut key 376 with the circumferential key 342 of the adapter sleeve 316. The snap ring 362 is then snapped into the circumferential slot 356 in the lock nut 320 to axially fix the lock nut 320 relative to the adapter sleeve 316. The adapter sleeve 316 and lock nut 320 are then slipped axially onto the shaft 312. The remaining components of the bearing assembly 310 are assembled on the shaft 312 and the bearing assembly 310 is dismounted from the shaft 312, as described above for the bearing assembly 10 shown in FIGS. 1-3.

While there have been shown and described what is at present considered the preferred embodiments of the invention, it will be obvious to those skilled in the art that various changes and modifications can be made therein without departing from the scope of the invention defined by the appended claims.

We claim:

1. A shaft mounting assembly comprising:
   a compressible adapter sleeve for wrapping around a shaft, said sleeve having a radially outwardly facing surface including a tapered surface;
   an inner ring encircling said adapter sleeve and having a radially inwardly facing surface engaging said tapered surface of said adapter sleeve;
   a lock nut encircling said adapter sleeve and interconnecting said adapter sleeve and said inner ring; and
   a visual indicator indicating when said adapter sleeve is sufficiently tightened onto the shaft.

2. The shaft mounting assembly as in claim 1, in which said compressible adaptor sleeve is a split cylindrical adapter sleeve.

3. The shaft mounting assembly as in claim 1, in which said visual indicator is fixed to said lock nut.

4. The shaft mounting assembly as in claim 1, including a positive locking key interposed between said adapter sleeve and said inner ring and rotatively locking said inner ring relative to said adapter sleeve.

5. The shaft mounting assembly as in claim 4, in which said positive locking key is axially fixed to one of said adapter sleeve and said inner ring, and said positive locking key is received in an axially extending slot formed in the other of said adapter sleeve and said inner ring.

6. The shaft mounting assembly as in claim 4, in which said positive locking key is a Woodruff key received in a concave rounded slot formed in said one of said adapter sleeve and said inner ring.

7. The shaft mounting assembly as in claim 1, in which said lock nut is axially fixed relative to said adapter sleeve and includes inner threads threadably engaging external threads formed in said radially outwardly facing surface of said inner ring to draw said inner ring over said adapter sleeve.

8. The shaft mounting assembly as in claim 1, in which said visual indicator is received in a cavity formed in said lock nut.

9. The shaft mounting assembly as in claim 1, in which said visual indicator includes a photoelastic sensitive material which when subjected to strain changes color when viewed through a polarizing lens.

10. The shaft mounting assembly as in claim 9, including a polarizing lens bonded to an outer surface of said photoelastic sensitive material.

11. The shaft mounting assembly as in claim 1, including a lock nut adapter fixed to said inner ring and axially extending screws extending through said lock nut engage said lock nut adapter to draw said inner ring over said adapter sleeve.

12. The shaft mounting assembly as in claim 1, including a key interposed between said lock nut and said adapter sleeve to axially fix said lock nut relative to said adapter sleeve.

13. The shaft mounting assembly as in claim 12, in which said key extends radially outwardly from said adapter sleeve and is sandwiched between a snap ring received in a radially inwardly opening circumferential slot formed in said lock nut and a key extending radially inwardly from said lock nut to axially fix said lock nut relative to said adapter sleeve.

14. The shaft mounting assembly as in claim 1, in which said positive locking key is formed as an integral part of at least one of said adapter sleeve and said inner ring.

* * * * *